United States Patent Office 3,489,502
Patented Jan. 13, 1970

3,489,502
REACTIVE DYESTUFF COMPOSITIONS
John Nahum Delahunty, Robert Norman Heslop, and Wilfred Charles Ingamells, Manchester, England, assignors to Imperial Chemical Industries Limited, London, England, a corporation of Great Britain
No Drawing. Filed July 12, 1967, Ser. No. 652,707
Claims priority, application Great Britain, July 18, 1966, 32,168/66
Int. Cl. D06p $1/20$, $1/24$
U.S. Cl. 8—25                                6 Claims

---

ABSTRACT OF THE DISCLOSURE

This specification describes the use of mixtures of dyestuffs of the general formula:

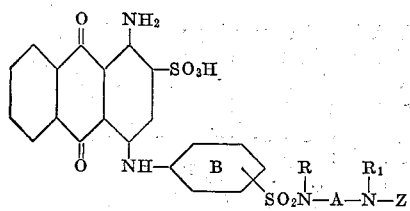

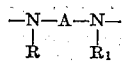

in which A stands for a divalent aliphatic radical containing from 2 to 6 carbon atoms or for a phenylene, phenylenealkylene or naphthylene radical which may contain sulphonic acid groups.
R and $R_1$ stand for hydrogen, an alkyl group of 1 to 4 carbon atoms or a substituted alkyl group of 1 to 4 carbon atoms or R and $R_1$ are joined together so that the $$-\underset{R}{N}-A-\underset{R_1}{N}-$$

group represents a 1,4-divalent piperazine radical, the benzene ring B may be further substituted, and Z stands for the radical of an organic acid which radical contains at atom or group capable of entering into chemical reaction with the hydroxyl groups of cellulose, and at least two of the species having different radicals represented by A for dyeing cellulose textile materials. The use of mixtures enables much stronger shades to be obtained than can be obtained from the individual dyestuffs of the mixture.

---

This invention relates to new reactive dyestuff compositions and more particularly to new mixtures of reactive dyestuffs which mixtures are suitable for dyeing cellulose textile materials in bright reddish-blue shades.

U.K. specification No. 912,372 describes and claims water-soluble anthraquinone dyestuffs of the formula:

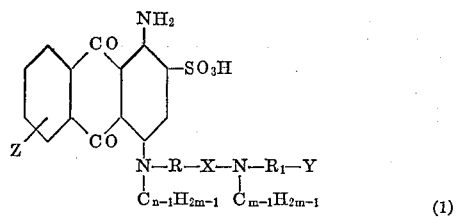

in which Z represents a sulphonic acid group or a hydrogen atom, $n$ and $m$ each represent a whole number, R represents a benzene residue, $R_1$ represent a benzene residue or an alkylene bridge, X represents a —CO— or —SO$_2$— group, and Y represents an acylated amino group in which the acyl group is known to be capable of entering into chemical combination with cellulosic fibrous material. A disadvantage of these dyestuffs is that in general, their solubility and/or dyeing properties are such that the dyer is unable to obtain shades as strong as those obtainable from commercially-available dyestuffs of similar shade.

It has now been found, however, that this defect can be overcome by using certain mixtures of the dyestuffs. These mixtures can be formed by mixing together the preformed dyestuffs or, in suitable cases, by so choosing the reactants during the preparative process as to obtain a mixture of the desired constituent dyestuffs.

According to the invention there are provided mixtures of reactive dyestuffs in which the species comprising the mixture are represented by the formula:

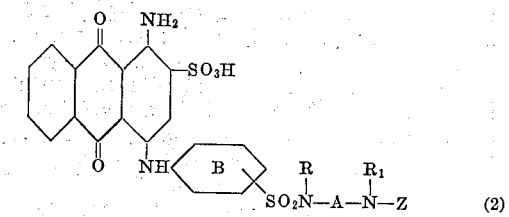

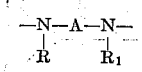                                (2)

in which A stands for a divalent aliphatic radical containing from 2 to 6 carbon atoms or for a phenylene, phenylenealkylene or naphthylene radical which may contain sulphonic acid groups.
R and $R_1$ stand for hydrogen, an alkyl group of 1 to 4 carbon atoms or a substituted alkyl group of 1 to 4 carbon atoms or R and $R_1$ are joined together so that the $$-\underset{R}{N}-A-\underset{R_1}{N}-$$

group represents a 1,4-divalent piperazine radical.
The benzene ring B may be further substituted, and Z stands for the radical of an organic acid which radical contains an atom or group capable of entering into chemical reaction with the hydroxyl groups of cellulose, and at least two of the said species having different radicals represented by A.

As examples of further substituents which may be present in the benzene residue B, there may be mentioned chlorine and bromine atoms and methyl and methoxy groups.

As examples of alkyl and substituted alkyl groups represented by R and $R_1$ there may be mentioned methyl, propyl and hydroxyethyl.

As examples of radicals represented by A, there may be mentioned alkylene and hydroxyalkylene radicals, for example ethylene, propylene, hexylene, isopropylene and hydroxypropylene, alkylene ether radicals for example the —$C_2H_4OC_2H_4$— radical, and benzene radicals, for example, phenylene, toluylene and sulphophenylene, phenylene radicals, for example benzylene and phenylene ethylene, and naphthalene radicals, for example monosulphonaphthalene.

Where the mixture contains only two of the above species, it is preferred that there is at least 20% by weight of that forming the minor proportion. In general, however, best results are obtained wherein the ratio of the two constituents lies between 50:50 and 70:30.

As examples of acyl radicals which are represented by Z there may be mentioned, for example, the radicals of $\alpha$:$\beta$-unsaturated aliphatic carboxylic acids such as acrylic acid, $\alpha$-chloroacrylic acid, propiolic acid, maleic acid and mono- and di-chloromaleic acids; more particularly, Z may represent the radical of an acid which contains a labile halogen atom or a group which readily splits off to form an anion, for example, the radical of a halogenated aliphatic acid such as chloroacetic acid, $\beta$-chloro and $\beta$-bromo-propionic acids and $\alpha$,$\beta$-chloro propionic acid or more especially, a heterocyclic radical which contains from 2 to 3 nitrogen atoms in the heterocyclic ring and at least one labile substituent on a carbon atom of the ring. By a labile substituent there is meant an atom or group which is bound to a carbon atom in ortho position to a nitrogen atom of the heterocyclic ring which atom or group is readily replaced by a hydroxyl group under aqueous alkaline conditions.

As examples of such heterocyclic radicals, there may be mentioned, for example 2,3-dichloro-quinoxaline-5- or -6-sulphonyl, 2,3-dichloro-quinoxaline-5- or -6-carbonyl, 2,4-dichloro-quinazoline-6- or -7-sulphonyl, 2,4,6-trichloro-quinazoline-7- or 8-sulphonyl, 2,4,7- or 2,4,8-trichloro-quinazoline - 6 - sulphonyl, 2,4-dichloro-quinazoline-6-carbonyl, 1,4-dichloro-phthalazine-6-carbonyl, 2:4-dichloro-pyramidine-5-carbonyl and, more particularly s-triazine-2-yl and pyramidin-2-yl or -4-yl radicals which contain on at least one of the remaining 2,4 or 6 positions, a bromine or, preferably, a chlorine atom, a sulphonic acid group, a thiocyano group, an aryloxy or arylthio group containing an electronegative substituent such as sulphophenoxy, sulphophenylthio, nitrosulphophenoxy, disulphophenoxy and sulphonaphthoxy; or a group of the formula:

wherein Y' represents the group of atoms necessary to form a 5- or 6-membered heterocyclic ring which may carry substituents or form part of a fused ring system; or a quaternary ammonium or pyrindinium group; or a group of the formula:

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; or a group of the formula:

wherein $R_3$ and $R_4$ may be the same or different and each represent sa hydrogen atom or an alkyl, aryl or aralkyl group.

In the cases where the pyrimidine ring or triazine ring carries only one such labile substituent, the said ring may have a non-labile substituent on the remaining carbon atoms.

By a non-labile substituent there is meant a group which is bound by a covalent bond to a carbon atom of the triazine or pyrimidine nucleus, which covalent bond is not ruptured under the conditions used for application of the reactive dye. As examples of such substituents, there may be mentioned, for example, primary amino and hydroxyl groups, also mono- or di-substituted amino groups etherified hydroxyl and etherified mercapto groups; in the case of substituted amino groups, this class includes, for example, mono- and di-alkylamino groups in which the alkyl groups preferably contain at most 4 carbon atoms, and which may also contain such substituents as chlorine atoms or hydroxyl, alkoxy or sulphate groups; and phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to about 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, β - chloroethylamino, cyclohexylamino, anilino, sulphophenylamino, disulphophenyl- amino, N-methyl-sulphophenylamino, N-β-hydroxyethyl-sulphophenylamino, carboxyphenylamino and sulphocarboxyphenylamino, methoxy, ethoxy and butoxy, phenoxy, methylphenoxy, chlorophenoxy and phenylthio groups. Chlorine atoms or cyano nitro, carboxy or carbalkoxy groups in the 5 position of a pyrimidinyl radical come into the category of non-labile substituents.

A preferred class of mixtures are those comprising compounds of the formula:

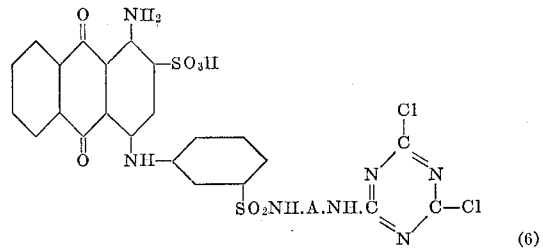

in which A has the meaning stated above. Above all are preferred those in which A represents alkylene of 2 to 3 carbon atoms in the different compounds.

The compounds used in the new mixtures can be obtained by reacting together an anthraquinone compound of the formula:

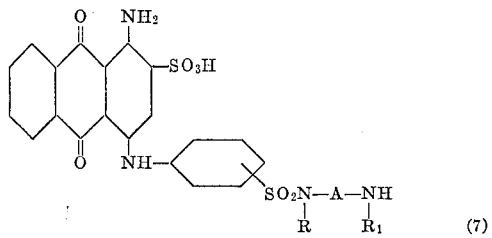

with the halide or anhydride of an organic acid which also contains an atom or group capable of entering into chemical reaction with the hydroxyl groups of cellulose.

When applied in conjunction with an acid-binding agent, the new mixtures afford reddish-blue dyeings of excellent fastness to washing and to light and are remarkable for the strength of dyeing which can be achieved, especially when applied in the beck or on the winch or jig.

The invention is illustrated but not limited by the following examples in which parts and percentages are by weight:

EXAMPLE 1

(a) A solution of 5.16 parts of 1-amino-4-[3'-N(β-aminoethyl)sulphamylanilino]anthraquinone - 2 - sulphonic acid and 0.6 part of sodium hydroxide in 145 parts of water and 20 parts of acetone is added, during 15 minutes, to a stirred suspension of 3.7 parts of cyanuric chloride in 25 parts of acetone and 75 parts of ice-water, the pH of the mixture being maintained at 8.5–9 by the addition, when necessary, of 2 N sodium hydroxide solution and the temperature maintained at 0–3° C. The reaction mixture is stirred at pH 8.5–9 and at 0–3° C. for a further 1¼ hours after addition is complete and is then filtered.

(b) A solution of 6.88 parts of the disodium salt of 1-amino - 4[3' - N(4" - aminophenyl)sulphamylanilino]anthraquinone-2:3"-disulphonic acid in 130 parts of water is added during 20 minutes to a stirred suspension of 1.94 parts of cyanuric chloride in 75 parts of ice-water and 12 parts of acetone, the temperature of the mixture being maintained at 0–5° C. and the pH at 5 to 5.5 by the addition, as necessary, of 2 N sodium carbonate solution. The mixture is stirred for a further ¾ hour at 0–5° C. and pH 5±0.2 and is then screened to remove excess cyanuric chloride.

The solution obtained is combined with the solution obtained from (a) above, the pH of the mixed solution is adjusted to 6.4 and a solution of 12 parts of sodium diethylmetanilate and 0.75 part of sodium hydrogen sulphate in 40 parts of water added with stirring followed by 10 parts (w./v.) of sodium chloride. The dyestuff so precipitated is filtered, washed with a solution of 24 parts of sodium chloride, 0.37 part of sodium hydrogen sulphate and 6 parts of sodium diethylmetanilate in 240 parts of water and dried in vacuo at room-temperature.

EXAMPLE 2

A solution of 43 parts of 1-amino-4[3′-N(β-aminoethyl)sulphamylanilino]anthraquinone-2-sulphonic acid and 44.2 parts of 1-amino-4[3′-N(β-aminopropyl)sulphamylanilino]anthraquinone-2-sulphonic acid in a mixture of 1780 parts of water, 330 parts of acetone and 125 parts of 2 N sodium hydroxide solution is added during approximately 20 minutes to a stirred suspension of 61.5 parts of cyanuric chloride in 715 parts of water and 300 parts of acetone at 0°–5° C. The pH of the reaction mixture is maintained during the addition at 8.5–9.0 by the addition of 2 N sodium hydroxide as and when necessary. The mixture is stirred a further 1¼ hours at 0–5° C. and pH 8.5–9.0, then filtered from excess cyanuric chloride and the solution, after adjusting to pH 6.4 is treated, at room-temperature with 5% (w./v.) sodium chloride. The suspension is allowed to settle, the liquors decanted away and the product stirred with 2000 parts of 5% sodium chloride. The dyestuff is finally filtered, washed with 5% brine, dried in vacuo at room-temperature and mixed thoroughly with a mixture of 12.2 parts of sodium N-diethyl metanilate and 0.8 part of sodium hydrogen sulphate.

This product when applied to cellulose fibres from a dyebath of 5:1 liquor to goods ratio using 10 g. per litre of Glaubers Salt and 15 g. per litre of sodium carbonate at 40° C. gives bright reddish-blue shades in good tinctorial yield and possessing very good fastness to light and wet treatments.

EXAMPLE 3

100 parts of mercerised cotton poplin are immersed in a solution of 1.5 parts of the dyestuff:

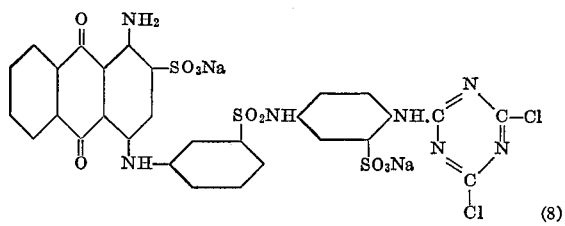

(8)

and 1.5 parts of the dyestuff:

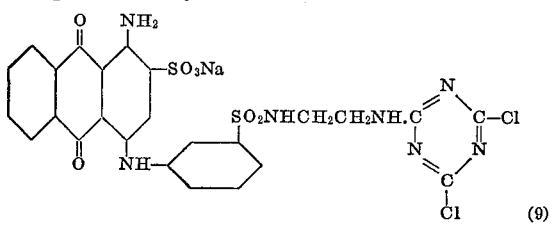

(9)

in 500 parts of water and 25 parts of sodium chloride are added. After dyeing at 40° C. for 30 minutes, 7.5 parts of anhydrous sodium carbonate are added and dyeing continued for a further 30 minutes at 40° C. The dyed fabric is then rinsed in water, washed off at the boil for 10 minutes in 3000 parts of water containing 6 parts of a non-ionic detergent, rinsed and finally dried. A bright reddish-blue shade with very good anti-staining properties and very good light fastness is obtained and shows better tinctorial yield than that obtained from a 3% dyeing of either of the individual dyestuffs.

EXAMPLE 4

A solution of 5.16 parts of 1-amino-4[3′-N(β-aminoethyl)sulphonyl anilino] anthraquinone-2-sulphonic acid and 5.3 parts of 1-amino-4[3′-N(β-aminopropyl) sulphonyl anilino] anthraquinone-2-sulphonic acid in a mixture of 116 parts of water, 40 parts of acetone and 15 parts of 2 N sodium hydroxide solution is added during 30 minutes to a stirred suspension of 8.0 parts of 5-cyano-2:4:6-trichloropyrimidine in 85 parts of water and 32 parts of acetone at 0°–5° C. The pH of the reaction mixture is maintained during the addition at 8.5–9.0 by the addition of 2 N sodium hydroxide as and when necessary. The mixture is stirred a further 1½ hours at 0–5° C. and pH 8.5–9.0, then filtered and the solution run gradually into 500 parts of 25% sodium chloride solution; 100 parts of sodium chloride is added to the stirred mixture during the addition of the above solution. After stirring and warming to 35° C., the suspension obtained is cooled to room temperature then filtered and the product washed with 5% (w./v.) sodium chloride solution, dried at room temperature in vacuo and finally mixed with approximately 10% of its weight of sodium N-diethyl metanilate/sodium hydrogen sulphate buffer mixture as described in Example 2. This dyestuff is similar in shade and properties to the product obtained in Example 2 and shows an improved tinctorial yield over either of the corresponding individual dyestuffs.

A similar, but redder shade, dyestuff is obtained when the above 1-amino-4[3′-N(β-aminoethyl) sulphonylanilino] anthraquinone-2-sulphonic acid and its N-β-aminopropyl analogue are replaced by equivalent amounts of 1-amino-4[2′:4′:6′-trimethyl-3′-N (β-aminoethyl) sulphamylanilino]anthraquinone - 2 - sulphonic acid and its 2′:4′:6′-trimethyl-N-β-aminopropyl analogue.

EXAMPLE 5

A solution of 2.58 parts of 1-amino-4 [3′-N(β-aminoethyl) sulphamylanilino] anthraquinone-2-sulphonic acid and 2.65 parts of 1-amino-4[3′-N(β-aminopropyl) sulphamylanilino] anthraquinone-2-sulphonic acid in a mixture of 100 parts of water, 20 parts of acetone and 7.5 parts of 2 H sodium hydroxide solution is cooled to 10° C. and a solution of 5.23 parts of 2:3-dichloro quinoxaline-6-carbonyl chloride in 10 parts of acetone added, with stirring, during 1 hour; the pH of the reaction mixture was maintained at 10.0 by addition of 2 N sodium hydroxide and the temperature at 10° C. throughout. After stirring a further 1 hour under the same conditions, the mixture was filtered with the aid of "Hyflo Supercel" and the filtrates added dropwise with stirring to 200 parts of 30% (w./c.) sodium chloride solution; 60 parts of sodium chloride were also added gradually to maintain the concentration at approximately 30% sodium chloride solution. The solid precipitate was collected by decantation and stirred in 15% (w./v.) sodium chloride solution, then filtered washed with 10% (w./v.) sodium chloride solution and dried in vacuo at room temperature. The dyestuff was finally buffered with approximately 10% of its weight of sodium N-diethylmetanilate/sodium hydrogen sulphate mixture as described in Example 2.

A similar dyestuff was obtained by substituting the above dichlorquinoxaline carbonyl chloride with an equivalent amount of 2:4-dichloropyrimidine-5-carbonyl chloride.

EXAMPLE 6

A solution of 5.6 parts of 1-amino-4-{3′-N[β-(β-hydroxyethylamino)ethyl] sulphamylanilino} anthraquinone-2-sulphonic acid in a mixture of 125 parts of water. 20 parts of acetone and 15 parts of N sodium hydroxide solution is added during approximately 20 minutes to a stirred suspension of 3.7 parts of cyanuric chloride in 75 parts of water and 20 parts of acetone at 0°–5° C.; during the addition the pH of the reaction mixture is maintained at 8.5–9.0 by the addition, when necessary, of 2 N sodium hydroxide solution. The mixture is stirred under the above conditions for a further 1 hour, the pH then allowed to fall to 6.8 and the mixture filtered.

The solution obtained, is combined with a solution prepared exactly as described in Example 1 (a), the pH of the mixture adjusted to approximately 6.4 and 5% (w./v.) sodium chloride added with stirring.

The dyestuff so precipitated is filtered, washed with a solution of 20 parts of sodium chloride, 3 parts of anhydrous potassium dihydrogen phosphate in 500 parts of water and finally dried at room temperature in vacuo.

What we claim is:

1. New reactive dyestuff compositions containing as essential ingredients a plurality of species of the formula:

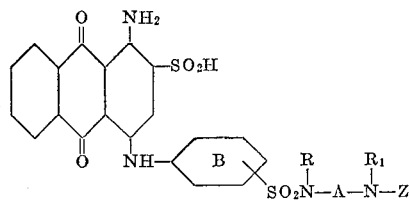

in which A stands for a divalent aliphatic radical containing from 2 to 6 carbon atoms or for a phenylene, phenylenealkylene or naphthylene radical which may contain sulphonic acid groups.

R and $R_1$ stand for hydrogen, an alkyl group of 1 to 4 carbon atoms or a substituted alkyl group of 1 to 4 carbon atoms or R and $R_1$ are joined together so that the

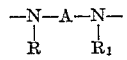

group represents a 1,4-divalent piperazine radical, the benzene ring B may be further substituted, and Z stands for the radical of an organic acid which radical contains an atom or group capable of entering into chemical reaction with the hydroxyl groups of cellulose, and at least two of the said species having different radicals represented by A.

2. Compositions as claimed in claim 1 having two only of the said species, there being at least 20% by weight of each.

3. Compositions as claimed in claim 2 wherein the ratio by weight of the two species lies between 50:50 and 70:30.

4. Compositions as claimed in claim 1 comprising compounds of the formula:

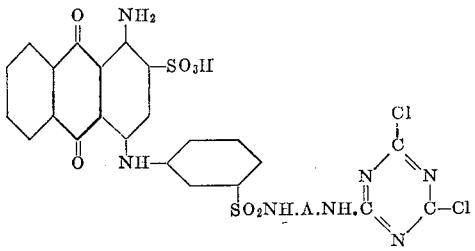

in which A has the meaning stated in claim 1.

5. Compositions as claimed in claim 4 wherein A represents an alkylene radical of 2 or 3 carbon atoms in the different compounds.

6. A process for colouring cellulose textile materials which comprises applying thereto an aqueous dye solution or printing paste containing a dyestuff composition as claimed in claim 1 and fixing the dyestuff on the fibre by the action of an acid-binding agent.

References Cited

UNITED STATES PATENTS 3,070,610  12/1962  Buehler _____ 8—39
3,232,931  1/1966   Rothman _____ 8—25

DONALD LEVY, Primary Examiner

U.S. Cl. X.R.

8—39